United States Patent [19]
Winkeljann et al.

[11] Patent Number: 5,288,190
[45] Date of Patent: Feb. 22, 1994

[54] EXPANSION DOWEL ASSEMBLY

[75] Inventors: Antonius Winkeljann, Landsberg/Lech; Franz-Paul Mayr, Hechenwang, both of Fed. Rep. of Germany

[73] Assignee: Hilti Aktiengesellschaft, Fürstentum, Liechtenstein

[21] Appl. No.: 914,984

[22] Filed: Jul. 16, 1992

[30] Foreign Application Priority Data

Jul. 18, 1991 [DE] Fed. Rep. of Germany ....... 4123802

[51] Int. Cl.$^5$ ............................................. F16B 13/06
[52] U.S. Cl. ........................................ 411/55; 411/60
[58] Field of Search ................. 411/55, 44, 63, 60, 411/61, 31

[56] References Cited

U.S. PATENT DOCUMENTS

| | | | |
|---|---|---|---|
| 4,519,735 | 5/1985 | Mächtle | 411/44 |
| 4,690,597 | 9/1987 | Liebig | 411/32 |
| 4,797,044 | 1/1989 | Velasco | 411/55 |
| 4,810,141 | 3/1989 | Rainville | 411/55 |
| 4,854,793 | 8/1989 | Ollivier | 411/55 |
| 4,966,511 | 10/1990 | Lee | 411/55 |
| 4,986,711 | 6/1991 | Fischer | 411/60 |

FOREIGN PATENT DOCUMENTS

| | | | |
|---|---|---|---|
| 1500721 | 4/1969 | Fed. Rep. of Germany | 411/55 |
| 510113 | 11/1920 | France | 411/55 |
| 6505901 | 11/1965 | Netherlands | 411/55 |

*Primary Examiner*—Flemming Saether
*Attorney, Agent, or Firm*—Anderson Kill Olick & Oshinsky

[57] ABSTRACT

An expansion dowel assembly for use in undercut bores in a receiving material includes an axially extending anchor bolt with a load application section at a trailing end region of the bolt and an expansion cone at a leading end region thereof. An expansion sleeve followed by a guide sleeve are arranged between the leading end region and the trailing end region of the anchor bolt. A component to be secured for a surface of the receiving material is centered by the guide sleeve and any lateral loads generated by the component are absorbed by the guide sleeve. The guide sleeve fits around a trailing end region of the anchor bolt and has an annular flange at its trailing end extending laterally outwardly from the guide sleeve and arranged to bear against a surface of the component.

5 Claims, 2 Drawing Sheets

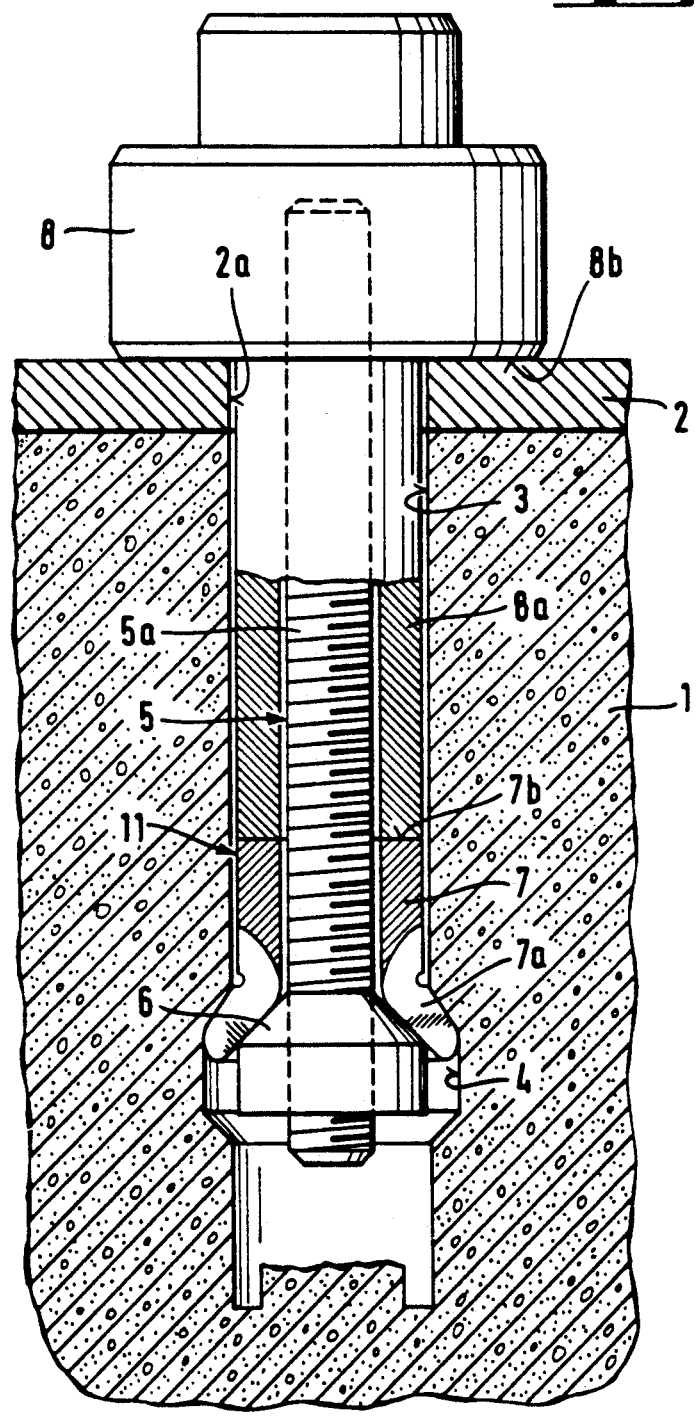

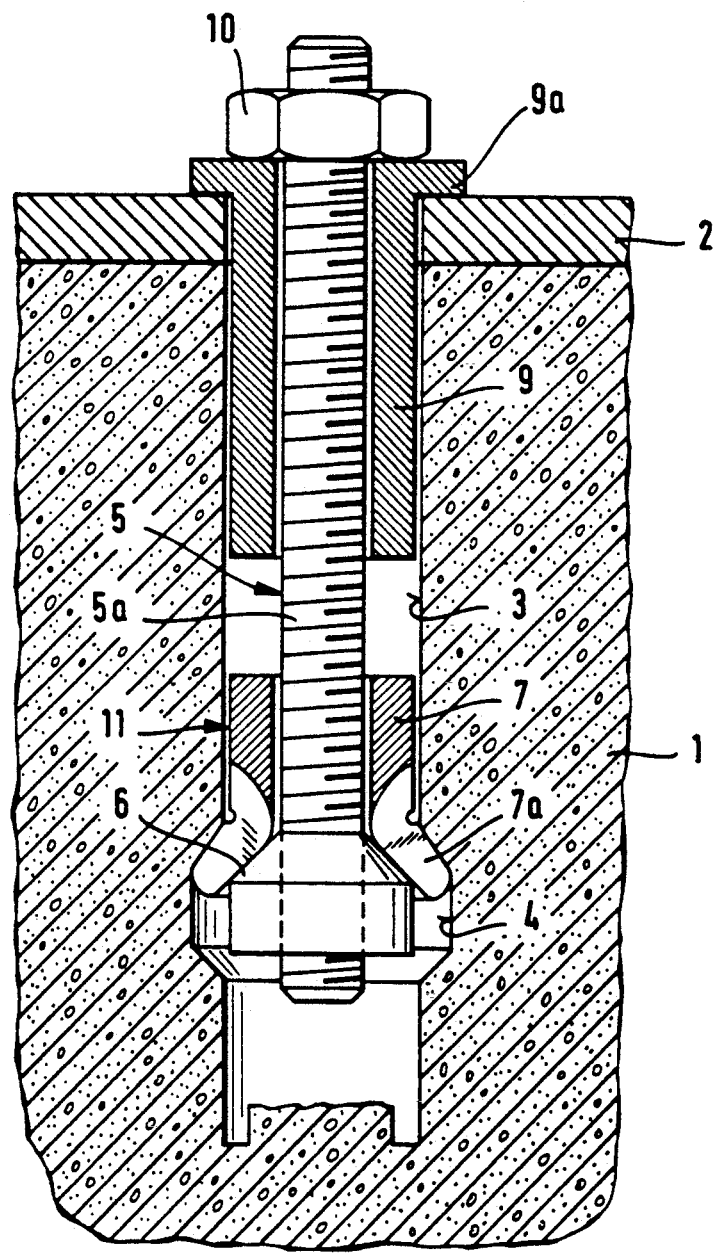

EXPANSION DOWEL ASSEMBLY

BACKGROUND OF THE INVENTION

The present invention is directed to an expansion dowel assembly for use in undercut bores in a receiving material for securing a structural component by means of an anchor bolt to the receiving material. The anchor bolt has an axially extending load application section extending from one end and an expansion cone fitted to the other end. An expansion sleeve to be placed in the undercut bore is at least partially slotted from a leading end. A guide sleeve having an outside diameter corresponding to the outside diameter of the expansion sleeve encircles the anchor bolt at its end with the load application section. The expansion cone on the anchor bolt can be pulled into the expansion sleeve for expanding it into the undercut bore.

An expansion dowel, disclosed in EP-A1-0226 524 includes an anchor bolt having an expansion cone on one end and a load engagement section in the form of an external thread at the other end. The external thread is arranged to receive a nut. Two tubular-shaped sleeves are arranged between the expansion cone and the nut with the sleeves having an outside diameter corresponding to the diameter of the bore in a receiving material into which the expansion dowel is to be anchored. The smallest inside diameter of the sleeve is slightly larger than the shank diameter of the anchor bolt.

The sleeve closer to the expansion cone called the expansion sleeve in the following description, has axially extending slots running opposite to the setting direction from an end face of the sleeve directed toward the expansion cone. The axially extending slots form individual expansion sections to be radially widened by the expansion cone.

The sleeve located rearwardly of the expansion sleeve is called a guide sleeve in the following description and serves for radial guidance of the anchor bolt into the bore.

During the expansion process, a structural component to be fastened to a surface of the receiving material can be placed against the receiving material. A through opening in the component has the same or slightly larger diameter than the bore in the receiving material. The expansion sections of the expansion sleeve are radially widened into the undercut portion of the bore by a suitable setting tool and by the expansion cone positioned on the anchor bolt. After the expansion sections are expanded, the setting tool is removed and the guide sleeve is slid into the bore over the anchor bolt.

The trailing end face of the guide sleeve can enter into the bore to such an extent that the transverse forces generated by the component bearing against the receiving material cannot be carried by the guide sleeve. Such a guide sleeve does not assure either a reliable centering of the component on the receiving material or a reliable support of a laterally directed load generated by the component. As a result, the effectiveness of the attachment is questionable, since an alignment of equal area of the trailing end face of the guide sleeves and the surface of the component located opposite the receiving material is not assured.

If the guide sleeve does not project into the range of the component in contact with the receiving material, the component can displace itself in the load application direction if a higher lateral load occurs, until the wall of the through opening of the component bears against the anchor bolt, whereby the anchor bolt is obliged to carry the entire lateral load. In superposition or overlap of the constant axial force generated during attachment of the component to the receiving material, an additional shear force acting perpendicularly thereto can result in an overload and may lead to a fracture of the anchor bolt.

SUMMARY OF THE INVENTION

The primary object of the present invention is to provide an expansion dowel assembly affording secure anchorage in an undercut bore and providing a guide sleeve for effectively centering a component on the receiving material and also absorbing any lateral load developed by the component.

In accordance with the present invention, the trailing end of the guide sleeve located at the outer surface of the component has a laterally projecting shoulder extending from the outside diameter of the guide sleeve and arranged to bear against the outer surface of the component.

The contact shoulder with the outer surface of the component assures the alignment of the guide sleeve with respect to the surface of the component whereby the component is effectively centered and any lateral transverse loads are safely absorbed. When the expansion dowel assembly is secured in the undercut bore, the adjacent end faces of the guide sleeve and the expansion sleeve are in spaced relation.

The axial length of the guide sleeve is preferably in the range of 0.6 to 2.5 times the outside diameter of the guide sleeve. The receiving material can have different degrees of hardness. With a softer material, it is advantageous to provide a longer guide sleeve extending into the bore of the receiving material, so that it is capable of carrying or absorbing the lateral load applied by the component to the receiving material. Accordingly, the lateral load is distributed over a larger area.

In actual practice, the shoulder is preferably in the range of 0.1 to 0.6 times the outside diameter of the guide sleeve. The strength of the shoulder can be determined by its axial height, whereby the use of a washer becomes superfluous. In a guide sleeve with a very large outside diameter, the axial height of the shoulder amounts to 0.1 times the outside diameter of the guide sleeve.

Contrary to known shoulders having the shape of cams, ribs, lugs or the like, the shoulder in the present invention is preferably shaped as a circular collar or flange. Such a configuration has the advantage that it assures a uniform contact with the surface of the component. The shoulder is formed as a circular flange particularly if it is to serve as a substitute for a washer.

The outside diameter of the flange is preferably in the range of 1.2 to 2 times the outside diameter of the guide sleeve. Depending on the type of component to be attached to the receiving material, the outside diameter of the flange can be of different magnitudes. When attaching components formed of a heavy material but of a low compression strength, it is preferred to use a guide sleeve which is relatively thick and has a large outside diameter.

If the face of the guide sleeve, directed towards the nut on the anchor bolt, is to be in the same plane with the surface of the component, it is possible to provide the mouth region of the bore in the component with a large chamfer, so that the collar of the guide sleeve can be seated into the open space formed by the chamfer. In such an embodiment, the flange on the guide sleeve is preferably thin.

In one preferred embodiment, the guide sleeve has several break-off locations in the form of a cross-sectional weakening spaced along its axial length. Such a guide sleeve can be matched to the strength of the component to be attached so that the expansion sleeve and the guide sleeve do not contact one another at their adjacent end faces. The break-off locations can be in the form of circular grooves or of openings located in one plane spaced around the circumference of the sleeve. Depending on the material forming the guide sleeve, the superfluous portion can be broken off from the remaining portion of the guide sleeve or it can be severed by a tool. Accordingly, the same guide sleeve can be used for different thicknesses of components.

Since the guide sleeve must carry lateral forces or loads, it must be assured that the break-off locations are not located in the axial region of the component or the axial region absorbing the lateral loads. Therefore, the break-off locations are advantageously positioned on the part of the guide sleeve spaced from the flange.

Apart from the break-off locations, markings or legends can be placed on the guide sleeve providing information to a user of how the guide sleeve is to be shortened in correspondence with the thickness of the component.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is an axially extending sectional view of a part of the expansion dowel assembly of the present invention with a setting tool arranged to expand the expansion sleeve; and FIG. 2 is a view similar to FIG. 1 showing the expansion dowel assembly of the present invention in the anchored state.

DETAILED DESCRIPTION OF THE INVENTION

FIG. 1 illustrates the widening or expansion of an expansion sleeve 7 forming part of an expansion dowel 11 where a setting tool 8 known as such effects the expanding process and, since it is known, is not described in detail. Initially, the expansion sleeve in the original unexpanded condition along with an expansion cone 6 positioned on an anchor bolt 5 is connected with the setting tool 8. By means of the setting tool 8, the anchor bolt 5 is turned rotated by the setting tool until the expansion cone 6 contacts the expansion section 7a of the expansion sleeve 7 and the trailing end face 7b of the expansion sleeve rests against an axially extending tubular section 8a projecting from the setting tool 8. By matching the axial length of the tubular section 8a to the depth of the undercut section 4 cut in the surface of the bore 3, the positioning of the expansion segment 7a in the region of the undercut is achieved when the setting tool is inserted into the bore 3. If the component 2 rests on the receiving material 1 during the setting process, then the axial thickness of the component 2 must be taken into account when determining the length of the tubular section 8a.

The leading end face 8b of the setting tool 8 bears against the receiving material 1 or against the component 2 during the expanding process. The radial widening of the expansion section 7a is effected by an axial displacement of the anchor bolt and the expansion cone relative to the expansion sleeve bearing against the leading end of the tubular section 8a of setting tool 8. The expansion cone 6 is pulled by the anchor bolt 5 into the expansion sleeve 7 in the region of the expansion section 7a with the expansion section defined by axially extending slots in the expansion sleeve. As the expansion sections 7a are forced radially outwardly, they extend into and anchor the dowel in the undercut 4 of the bore 3.

After the expansion dowel has been anchored, the setting tool is removed from the anchor bolt 5 and is pulled out of the bore 3 and the opening 2a in the component 2. Subsequently, a guide sleeve 9 having a flange-like collar 9a is slid over the anchor bolt 5 and through the opening 2a in the component 2 into the bore 3 in the receiving material. The fastening of the component 2 onto the surface of the receiving material 1 is effected by a nut 10 threaded onto an axially extending threaded portion of the anchor bolt 5 forming the axially extending load application section 5a. The nut 10 is tightened by a suitable tool until the component 2 is secured to the receiving material 1. The expansion dowel assembly 11 secured in this manner is shown in FIG. 2. Note that the leading end face of the guide sleeve 9 is spaced axially from the trailing end face of the expansion sleeve 7.

While a specific embodiment of the invention has been shown and described in detail to illustrate the application of the inventive principles, it will be understood that the invention may be embodied otherwise without departing from such principles.

What is claimed is:

1. Expansion dowel assembly for use in undercut bores in a receiving material for securing a component to a surface of the receiving material, comprises an axially extending anchor bolt having a leading end to be inserted first into the undercut bore and a trailing end, said anchor bolt has an axially extending load engagement section extending from the trailing end toward the leading end thereof, an axially extending expansion sleeve having a leading end, a trailing end and an outside diameter, said expansion sleeve is slotted for at least a part of the axial length thereof from the leading end forming expansion sections between the slots, an axially extending guide sleeve having a leading end and a trailing end and an outside diameter, an expansion cone engageable on a leading end section of said anchor bolt and arranged to be pulled into the leading end of said expansion sleeve toward the trailing end thereof for radially expanding said expansion sections, wherein the improvement comprises that said guide sleeve has a flange-like shoulder formed on the trailing end thereof and projecting laterally outwardly from the outside diameter of said sleeve arranged to bear against a surface of the component facing away from the receiving material, said leading end of said guide sleeve securing the component to the receiving material is axially spaced from the trailing end of said expansion sleeve providing an unobstructed space therebetween for relative axial positioning of the guide sleeve with respect to the expansion sleeve, and said guide sleeve has an axial length sufficient to extend through the component into the bore.

2. Expansion dowel assembly, as set forth in claim 1, wherein said guide sleeve has an axial length in the range of 0.6 to 2.5 times the outside diameter of said guide sleeve.

3. Expansion dowel assembly, as set forth in claim 1 or 2, wherein the shoulder of said guide sleeve has an axial height in the range of 0.1 to 0.6 times the outside diameter of said guide sleeve.

4. Expansion dowel assembly, as set forth in claim 3, wherein said shoulder is formed as a circular flange.

5. Expansion dowel assembly, as set forth in claim 4, wherein the flange has an outside diameter in the range of 1.2 to 2 times the outside diameter of said guide sleeve.

* * * * *